2,709,658

PROCESS FOR TREATING POULTRY

Ben F. Buchanan, Wheaton, Ill., assignor to International Minerals & Chemical Corporation, a corporation of New York No Drawing. Application April 17, 1951,
Serial No. 221,537

16 Claims. (Cl. 99—194)

This invention relates to the treatment of poultry. More particularly, it relates to a commercial preparation of poultry for human consumption.

In recent years, the use of food products which have been precooked and which upon marketing may be merely heated or browned prior to serving has become widely popular. In the past, poultry, such as chicken, has not been so marketed in that a process has not been available to provide a chicken product which when reheated would present an appealing dish. Such products have in the past been impractical because the chicken, by the time it was reheated and reached the table, was so dry as to be unappetizing.

It is an object of the instant invention to provide a process for the treatment of poultry to obtain a precooked product which upon heating and browning is succulent and flavorful.

It is a further object of the instant invention to provide a process for the commercial treatment of poultry to obtain a precooked product which is ready to heat, brown, and serve and which retains moisture and palatability.

These and other objects of the instant invention will become apparent upon a fuller understanding of the invention as hereinafter set forth.

It has been discovered that poultry, which has been precooked so that after marketing it is ready to heat, brown, and serve, will be juicy and flavorful if treated in accordance with the instant novel process. In general, the instant process comprises aging poultry, the flesh of which has been injected with a solution nondeleterious to the poultry, then heating until the poultry is suitable for human consumption, and rapidly chilling the heated poultry.

More specifically, the instant novel process comprises injecting the flesh of poultry with an aqueous solution to the extent of between about 3% and about 8% by weight of the dressed poultry, chilling, and aging. The aged poultry is heated until it is suitable for human consumption and then rapidly cooled, for example, by treatment with chilled water maintained at a temperature below about room temperature and above about 32° F. Following the heating and chilling, the poultry is packaged, whole, halved, or cut into pieces, and stored in a cooler or freezer until marketed or used.

In one embodiment of the instant novel process, dressed, eviscerated and cleaned poultry, such as chicken, is injected with an aqueous solution to the extent of between about 3% and about 8% of the dressed weight of the chicken. The chicken is then cooled to a temperature of between about 32° F. and about 50° F. and stored in a cooler for at least about 12 hours. The chicken is then precooked by heating until it is suitable for human consumption. The precooking may be effected by heating the chicken in any suitable manner, such as by the use of high radio frequency waves or steam or hot water. The heated and precooked chicken is immediately and rapidly chilled by immersing in water maintained at a temperature of between about 32° F. and about 40° F., preferably at between about 32° F. and about 35° F. The water may be maintained within this temperature range by employing ice, cooling coils, or any other suitable means. After removal from the chilling bath, the product is then ready for packaging and marketing.

By the term "poultry," as used herein in the description and claims, is meant poultry such as chicken, duck, or turkey having its viscera removed and including either eviscerated cut-up poultry or eviscerated but otherwise whole poultry which has been cleaned and dressed, and also of the so-called ready-to-cook type.

In another embodiment of the instant invention, poultry, immediately after eviscerating, cleaning, and dressing, is injected with liquid in a number of different parts of the flesh; for example, injections are preferably made in both sides of the breast, in both thighs, in both drumsticks, and on the back. The injections are preferably made with a needle with perforations in its sides, as well as at the point, so that the liquid is injected into the flesh at a plurality of different points. Although any liquid which has no deleterious effect upon the food value of the poultry may be used, water or preferably an aqueous monosodium glutamate solution is used in practicing the instant invention. An aqueous monosodium glutamate solution is the preferred liquid injected into the poultry. The aqueous monosodium glutamate solution used contains between about 2% and about 10% by weight of monosodium glutamate. If the poultry which is injected with the monosodium glutamate solution has previously been packed in ice and is cold, between about 1.25% and about 1.50% by weight of gelatin or other similar stabilizer, which will hold the solution in the poultry while it is warming to room temperature, is added to the solution to be injected into the flesh of the poultry. After injecting the liquid into the poultry to the extent of between about 3% and about 8% of its dressed weight, the poultry is then air-chilled or chilled with cold water or in an ice bath, and then stored for at least about 12 hours.

The poultry, after aging, is precooked by heating until suitable for human consumption. For example, it is heated in a tank containing a broth maintained at a temperature of between about 145° F. and about 185° F. until the poultry is suitable for human consumption. Other suitable heating means may also be employed, such as high radio frequency heating to precook the poultry. The poultry is then immediately and rapidly cooled by immersing into water maintained at a temperature of between about 32° F. and about 40° F. It is necessary that the poultry be cooled immediately and rapidly in order to hold moisture and preserve flavor. If the cooling is gradual, the poultry loses moisture, along with the delicate volatile flavors, and when reheated will be dry and unappetizing.

The poultry, for example chicken which has been treated in accordance with the instant novel process, may be breaded with a coating of flour and egg to which seasoning has been added, then packaged and, if desired, frozen. The packaged product, which may be either breaded or unbreaded, is then stored in a cooler or in a freezer until marketed or used. Prior to serving, the product is browned by any suitable means, such as in a frying pan, in deep hot fat, in an oven, or in a broiler. The heating and browning usually is accomplished in a period of between about 3 and about 5 minutes. The chicken is then ready to serve. If the packaged chicken has been breaded and fully seasoned, the product requires no additional labor other than heating and browning.

In another modification of the instant invention, the liquid or broth in which the poultry is precooked, such as water, may be subsequently used to dissolve the monosodium glutamate and may be used as the injection solution.

As a specific example of the instant novel process, the following serves merely as illustration, and it is not intended that the scope of the invention be limited thereto.

*Example*

A dressed and cleaned broiler chicken weighing about 2 pounds was injected with an aqueous solution containing about 5% by weight of monosodium glutamate. The weight of the chicken after injection of the solution was about two pounds 1½ ounces. The chicken was cooled in an ice bath for 1 hour and then stored for about 16 hours in a cooler at a temperature of about 35° F. The chicken was then placed in a tank containing water maintained at about 160° F. for about 35 minutes, after which time it was removed from the tank and immediately immersed into an ice-water bath. The final weight of the chicken was about 2 pounds. The chicken was then packaged, quick frozen, and stored in a freezer.

A 2 pound broiler chicken which was subjected to the same treatment except that it was not injected with a monosodium glutamate solution lost about 1½ ounces of moisture and had a final weight of about 1 pound 14½ ounces. Upon reheating by browning in hot deep fat for 5 minutes, this chicken was dry and unpalatable compared with the chicken treated in accordance with the instant novel process.

Having thus fully described and illustrated the character of the invention, what is desired to be secured and claimed by Letters Patent is:

1. A process for treating poultry which comprises injecting an aqueous solution of monosodium glutamate to the extent of between about 3% and about 8% of the dressed weight of the poultry into a plurality of places in the flesh of the cleaned dressed poultry, aging the treated poultry at a temperature of between about 32° F. and about 50° F. for at least about 12 hours, heating the aged poultry in a broth until suitable for human consumption, and chilling by immersing the hot precooked poultry in water maintained at a temperature between about 32° F. and about 40° F.

2. A process for treating poultry which comprises injecting an aqueous solution containing between about 2% and about 10% by weight of monosodium glutamate to the extent of between about 3% and about 8% of the dressed weight of the poultry into a plurality of places in the flesh of the cleaned dressed poultry, aging the treated poultry at a temperature of between about 32° F. and about 50° F., heating the aged poultry until it is suitable for human consumption, and chilling by immersing the hot precooked poultry in water maintained at a temperature between about 32° F. and about 40° F.

3. A process for treating poultry which comprises injecting an aqueous solution containing between about 2% and about 10% by weight of monosodium glutamate to the extent of between about 3% and about 8% of the dressed weight of the poultry into a plurality of places in the flesh of the cleaned dressed poultry, aging the treated poultry at a temperature of between about 32° F. and about 50° F. for at least about 12 hours, heating the aged poultry in a broth maintained at a temperature of between about 145° F. and about 185° F. until it is suitable for human consumption, and chilling by immersing the hot precooked poultry in water maintained at a temperature between about 32° F. and about 40° F.

4. A process for treating poultry the body temperature of which is substantially below atmospheric temperature which comprises injecting an aqueous solution containing between about 2% and about 10% by weight of monosodium glutamate and between about 1.25% and about 1.50% by weight of gelatin to the extent of between about 3% and about 8% of the dressed poultry into a plurality of places in the flesh of the cleaned dressed poultry, aging the treated poultry at a temperature of between about 32° F. and about 50° F., heating the aged poultry until it is suitable for human consumption, and chilling by immersing the hot precooked poultry in water maintained at a temperature between about 32° F. and about 40° F.

5. A process for treating chicken the body temperature of which is substantially below atmospheric temperature which comprises injecting an aqueous solution containing between about 2% and about 10% by weight of monosodium glutamate and between about 1.25% and about 1.50% by weight of gelatin to the extent of between about 3% and about 8% of the dressed weight of the chicken into a plurality of places in the flesh of the cleaned dressed chicken, aging the treated chicken at a temperature of between about 32° F. and about 50° F. for at least about 12 hours, heating the aged chicken in a broth maintained at a temperature of between about 145° F. and about 185° F. until it is suitable for human consumption, and chilling by immersing the hot precooked chicken in water maintained at a temperature between about 32° F. and about 40° F.

6. A process for treating chicken which comprises injecting an aqueous solution containing between about 2% and about 10% by weight of monosodium glutamate to the extent of between about 3% and about 8% of the dressed weight of the chicken into a plurality of places in the flesh of the cleaned dressed chicken, aging the treated chicken at a temperature of between about 32° F. and about 50° F. for at least about 12 hours, heating the aged chicken in a broth maintained at a temperature of between about 145° F. and about 185° F. until it is suitable for human consumption, chilling by immersing the hot precooked chicken in water maintained at a temperature between about 32° F. and about 40° F., and quick freezing the cooled chicken.

7. A process for treating poultry which comprises injecting an aqueous solution containing between about 2% and about 10% by weight of monosodium glutamate to the extent of between about 3% and about 8% of the dressed weight of the poultry into a plurality of places in the flesh of cleaned dressed poultry, aging the treated poultry, heating the aged poultry until it is suitable for human consumption, and rapidly cooling the precooked poultry with water maintained at a temperature between about room temperature and about the freezing point of the water.

8. A process for treating poultry which comprises injecting an aqueous solution containing between about 2% and about 10% by weight of monosodium glutamate to the extent of between about 3% and about 8% of the dressed weight of the poultry into a plurality of places in the flesh of the cleaned dressed poultry, aging the treated poultry at a temperature between about 32° F. and about 50° F. for at least about 12 hours, heating the aged poultry until it is suitable for human consumption, and chilling by immersing the hot precooked poultry in water maintained at a temperature between about 32° F. and about 40° F.

9. A process for treating poultry which comprises injecting an aqueous solution containing between about 2% and about 10% by weight of monosodium glutamate to the extent of between about 3% and about 8% of the dressed weight of the poultry into a plurality of places in the flesh of cleaned dressed poultry, aging the treated poultry, heating the aged poultry until it is suitable for human consumption, quick chilling the cooked poultry by immersing in water maintained at a temperature between about 32° F. and about 40° F., and quick freezing the cooled poultry.

10. A process for treating poultry the body temperature of which is substantially below atmospheric temperature which comprises injecting an aqueous solution containing between about 2% and about 10% by weight of monosodium glutamate and between about 1.25% and about 1.50% by weight of gelatine to the extent of between about 3% and about 8% of the dressed weight of said poultry into a plurality of places in the flesh of the cleaned dressed poultry, aging at a temperature between about 32° F. and about 50° F. for at least about 12 hours, heating the aged poultry in a broth maintained at a temperature between about 145° F. and about 185° F. until it is suitable for human consumption, chilling by immersing the hot cooked poultry in water maintained at a temperature between about 32° F. and about 40° F., and quick freezing the cooled poultry.

11. A process of treating poultry which comprises injecting an aqueous solution of monosodium glutamate into a plurality of places in the flesh of cleaned, dressed poultry, aging the treated poultry at a temperature between about 32° F. and about 50° F., heating the aged poultry until it is suitable for human consumption, and rapidly cooling the precooked poultry by immersing it in water maintained at a temperature between the freezing point of the water and about room temperature.

12. A process of treating poultry which comprises injecting an aqueous solution of monosodium glutamate, containing between about two per cent and about ten per cent of monosodium glutamate, into a plurality of places in the flesh of cleaned, dressed poultry, aging the treated poultry at a temperature between about 32° F. and about 50° F., heating the aged poultry until it is suitable for human consumption, and chilling the hot, precooked poultry by immersing it in water maintained at a temperature of between about 32° F. and about 40° F.

13. A process as in claim 12 wherein the poultry is chicken.

14. A process as in claim 12 wherein the poultry is turkey.

15. A process as in claim 12 wherein the poultry is duck.

16. A process of treating poultry, the body temperature of which is substantially below atmospheric temperature, comprising injecting an aqueous solution of monosodium glutamate, containing between about 1.25% and about 1.50% of gelatin, into a plurality of places in the flesh of the cleaned, dressed poultry, aging the treated poultry, heating the aged poultry until it is suitable for human consumption, and chilling the hot, precooked poultry by immersing it in water maintained at a temperature of between about the freezing point of the water and about room temperature.

References Cited in the file of this patent

UNITED STATES PATENTS

| | | |
|---|---|---|
| 1,740,176 | Hormel et al. | Dec. 17, 1929 |
| 2,128,952 | Mareta | Sept. 6, 1938 |
| 2,444,127 | Zublin | June 29, 1948 |

OTHER REFERENCES

"Industrial and Engineering Chemistry," October 1929, pages 984 to 987, inclusive, article entitled "Monosodium Glutamate as a Chemical Condiment."